Oct. 24, 1967  R. J. ANETSBERGER ET AL  3,348,472
OPEN HEARTH BROILER
Filed Feb. 2, 1965  2 Sheets-Sheet 2
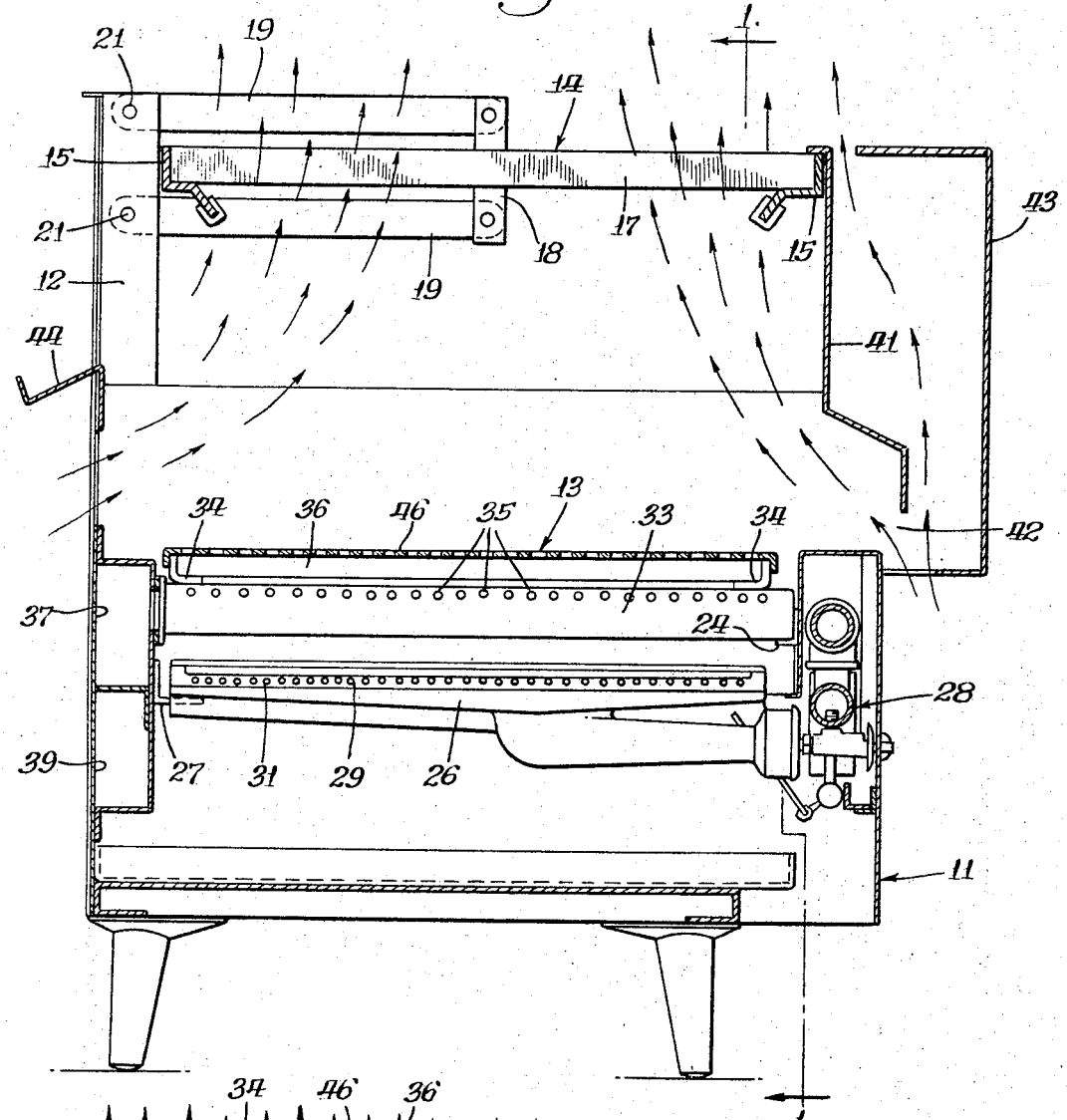
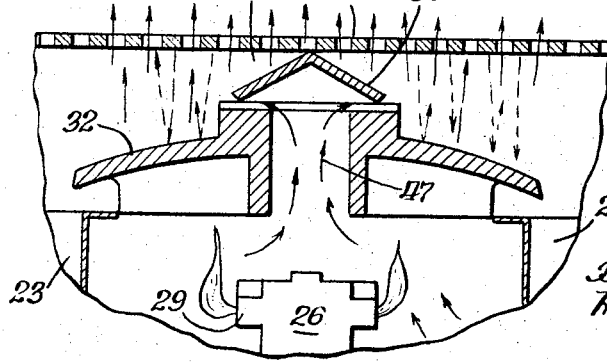
Inventors:
Richard J. Anetsberger
John A. Anetsberger
By:
Horton, Davis, Brewer, & Brugman
Attys.

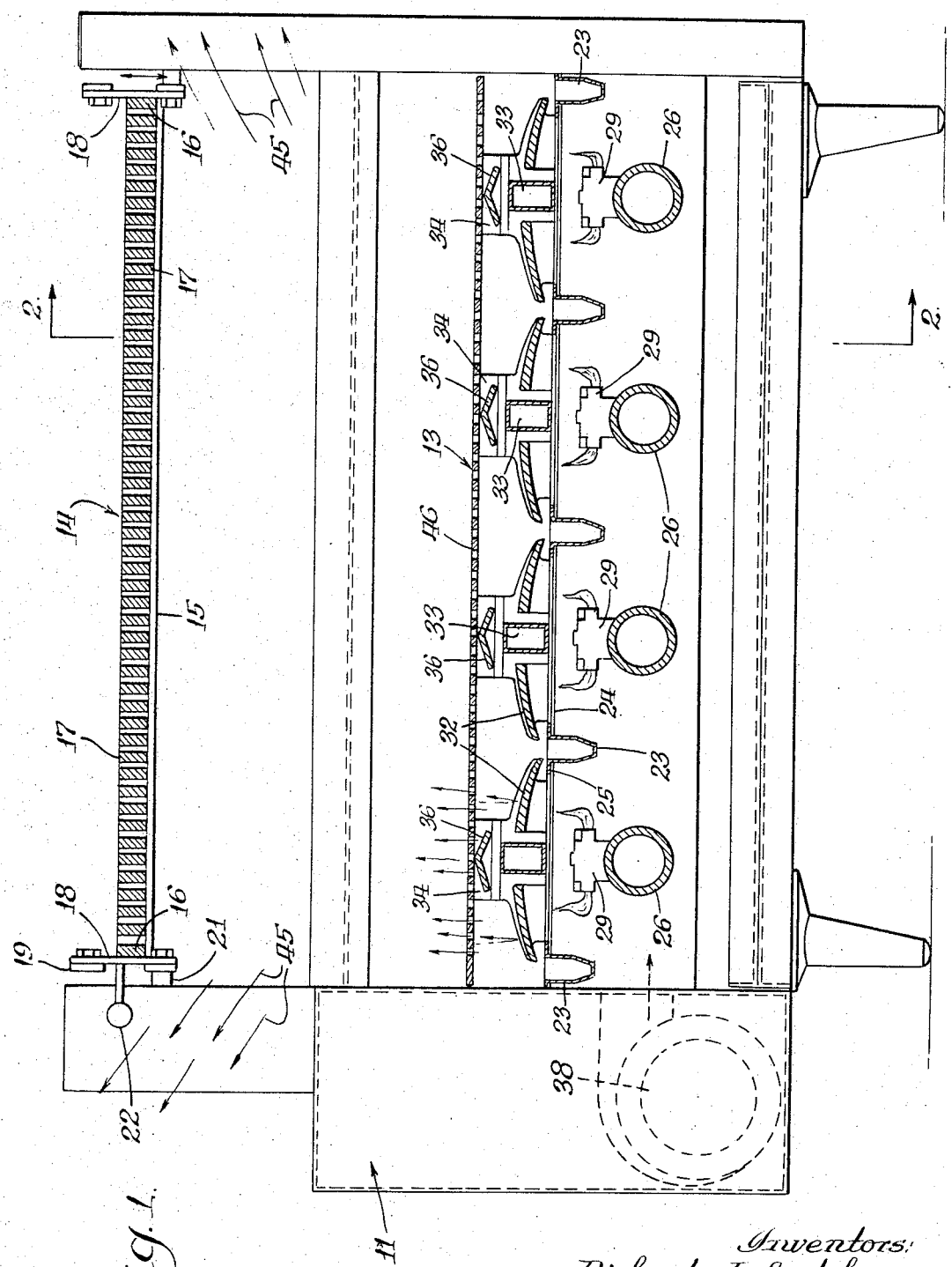

United States Patent Office 3,348,472
Patented Oct. 24, 1967

3,348,472
OPEN HEARTH BROILER
Richard J. Anetsberger and John A. Anetsberger, Northbrook, Ill., assignors to Anetsberger Brothers, Inc., Northbrook, Ill., a corporation of Illinois
Filed Feb. 2, 1965, Ser. No. 429,748
4 Claims. (Cl. 99—447)

This invention relates in general to broilers, and more particularly to open hearth type broilers especially adapted for commercial fast serve drive-in installations.

The open hearth type of commercial broiling has become very popular, largely because of the infra-red rays employed and the showmanship aspect resulting from the flaming or flare-up of grease or fat dripping from the meat being so cooked. Controlling the flames and burning of the fat drippage has been recognizes as a serious problem, with the best solutions offered in the prior art being the provision of blower means to supply additional air for combustion and flame control directed horizontally in the space below the grid supporting the meat being broiled, as in United States Letters Patent No. 2,848,990, issued Aug. 26, 1958, and No. 3,146,693 dated Sept. 1, 1964.

However, these prior art broilers are not satisfactory for fast serve maximum turnover operations for several reasons. They do not provide a grid temperature which is uniform throughout the entire area of the grid nor which can be maintained constant at a desired value with any work load from full capacity down to nothing. They require frequent adjustment of the burners and of the air blower or grid to avoid excessive radiant heat and bare flame flare-up through the grid. This would present intolerable conditions for the operator to function in the desired manner, which requires rapid placement of the meat to be broiled, such as hamburger patties, in a very close pattern or relationship to each other on the grid, much in the manner of dealing out cards from a pack onto a table in closely adjacent rows and columns.

A principal object of this invention, therefore, is to maintain within extremely close tolerances a selectable grid temperature in an open hearth broiler substantially constant throughout the entire grid area indefinitely with the burners and air blower means full on and with any work load from nothing to full capacity.

Another important object is to maintain such a grid temperature in an open hearth broiler that can be tolerated by the operator for extended periods of time during which his hands are in very close proximity to the grid, and to prevent flames protruding through the grid.

A further object is to enhance the showmanship effect of open heart broiling by fully exposing to the view of prospective customers the entire operation, and particularly the flames flaring up from the heat source to the grid.

These objects are attained by opening up the upper grid-supporting portion of the cabinet housing an open hearth broiler on all sides between the grid and the heat source or radiant and burner assembly to the surrounding atmosphere to effect a cool air supply at the front, drafting at the rear and venting outwardly at the sides, instead of the prior art venting at the rear, and providing a novel grid comprising critically spaced parallel bars of rectangular cross section disposed on edge, and mounting heat retention means in the form of a perforated metal screen or plate across the top of the radiant and burner assembly.

Numerous other objects and advantages of this invention will be apparent as it is better understood from the following description which, when taken in connection with the accompanying drawings, discloses a preferred embodiment thereof.

In the drawings:
FIGURE 1 is a transverse sectional view, taken substantially on the line 1—1 of FIG. 2, as seen from the front of an open hearth broiler embodying the features of the invention;
FIGURE 2 is a vertical section taken substantially on the line 2—2 of FIG. 1, with parts omitted for the sake of clarity; and
FIGURE 3 is a detail vertical section through one of the radiant units of a modified firebox or heat chamber.

Referring more particularly to the drawings, reference numeral 11 indicates in general a cabinet or housing for an open hearth broiler embodying the features of this invention and which includes supporting frame members 12. Within the lower part of the cabinet 11, a heat source or radiant and burner assembly, generally indicated by reference numeral 13, is disposed, and a grid, generally indicated by reference numeral 14, is mounted in the upper part of the cabinet for adjustable vertical movement, in a manner to be later described.

The grid 14 comprises laterally extending front and rear channels 15 and side frame members 16 defining means for supporting on edge, in any suitable manner, a plurality of aluminum bars 17 extending from front to rear of the broiler in parallel spaced relationship relative to each other. This grid assembly 14 is vertically adjustably supported by a counter-balanced parallelogram link arrangement similar to that disclosed in U.S. Letters Patent No. 3,146,693, comprising a vertical bar 18 secured to the outer side of each of the side frame members 16 and pivotally connected adjacent its ends to the forward ends of upper and lower parallel links 19. The rear ends of these links are pivotally supported at 21 on one of the frame members 12, whereby the grid 14 will be maintained in a horizontal position during any vertical movements thereof relative to the heat source 13. A suitable latch handle 22 is secured to the grid 14 (FIG. 1) and extends from the left side thereof to effect adjustment of the grid and latching in any selected adjusted position in similar manner to that described in said Patent No. 3,146,693. Of course, the grid bars 17 may be made of any suitable material other than aluminum, if desired.

The heat source or radiant and burner assembly 13 includes a plurality of parallel and laterally spaced grease troughs 23 (FIG. 1) extending from front to rear of the broiler and supported at their ends by suitable brackets 24. The upper lateral edges of these grease troughs 23 are provided with horizontally extending flanges 25, and at a point slightly below those flanges, the side walls of the grease troughs may be provided, if desired, with a plurality of apertures spaced from each other lengthwise of the troughs.

The radiant and burner assembly 13 also includes a plurality of burners 26, with one such burner disposed between each pair of adjacent grease troughs 23. Each burner 26 is supported at its rear end by a bracket 27 (FIG. 2), and at its forward end it is supported and supplied in well-known manner with a proper mixture of primary air and gas by the usual valve and manifold mechanisms, indicated generally by reference numeral 28. As best seen in FIGS. 1 and 3, each burner 26 is formed with horizontal flanges 29 at opposite sides thereof which are provided with a plurality of uniformly spaced and horizontally extending gas jet openings 31 (FIG. 2).

Also forming part of the radiant and burner assembly 13 are a plurality of radiants 32, with one such radiant mounted above each of the burners 26 and supported by the adjacent flanges 25 on the grease troughs 23. Extending from front to rear of the broiler above each of the burners 26 and through the central portion of each of the radiants 32 is a substantially rectangular air duct 33, the closed forward end of which is supported on the front bracket 24. Each radiant 32 preferably includes a pair of cast iron radiant halves disposed at opposite sides of the air duct 33 and secured together by welding, or the like, to angle members 34 extending across the top of the associated air duct 33. These radiant halves have sloping upper surfaces overlying the lateral edge portions of the associated grease troughs 23 and designed to drain excess fat drippings into the latter. The air ducts 33 are provided in their side walls with a plurality of apertures 35 adjacent the tops of the ducts for directing a plurality of horizontally disposed jets of air across the said upper surfaces of the adjacent halves of the associated radiant 32. The top of each air duct 33 is shielded by an angle-shaped cap plate 36 extending between and secured to the angle members 34.

With this arrangement, the radiants 32 are heated by the burners 26 to cause the former to generate infra-red rays and to direct the same upwardly toward the grid 14. Drippings of fat from the food stuff being broiled on the grid 14 will be completely consumed either by burning on the upper surfaces of the radiants 32 or in the grease troughs 23, in the same manner as described in said Patent No. 3,146,693. This normally will be attendant with flames shooting upwardly to and through the grid 14. The air ducts 33 with their laterally directed horizontal apertures 35 were provided in the structure disclosed in No. 3,146,693 to supply additional air for combustion of the fat drippings and to control such flaming thereof. In this connection, the rear end of each air duct 33 is secured to, supported by, and communicates with, an air outlet manifold 37 (FIG. 2). As shown in FIG. 1, air is supplied to this outlet manifold 37 by a blower 38 which is suitably mounted at the left side of the broiler and receives such air from an inlet manifold 39 extending across the lower portion of the housing to preheat the air and so as not to interfere with the supply of secondary air to the burners 26 flowing into the lower portion of the housing through a suitable opening at its front end.

This portion of the mechanism hereinbefore described is substantially the same as that disclosed in said Patent No. 3,146,693. While eminently satisfactory for its intended purposes, it was found that this broiler mechanism was not adapted for fast serve maximum turnover operations, such as the broiling of hamburger patties disposed in close or contiguous relationship relative to each other over substantially the entire area of the grid 14, for the reasons previously outlined herein. To render this broiler structure satisfactorily useful for such operations, it was discovered that it was necessary to make the grid temperature uniform throughout the entire area of the grid, to maintain it at the desired degree or within the desired range at all times with the blower 38 operating at full capacity and regardless of the quantity of meat being broiled, i.e., under any conditions between non-use and substantially completely coverage of the grid, and to prevent flame-up from the drippings from extending upwardly completely through the grid.

In order to accomplish these desired results, it was found necessary to make several changes in, and additions to, the older structure hereinbefore described. One of these changes was to open up the upper portion of the cabinet or housing 11. To this end, the housing is substantially open on all four sides from a point slightly above the radiant and burner assembly 13. As best seen in FIG. 2, a concession is made in this respect by providing a heat shield 41 across the front of the broiler for the comfort of the operator, but this shield 41 is shaped, as therein illustrated, and spaced at its lower end from the outer front portion of the cabinet 11 to provide an inlet 42 for cooling air across substantially the full width of the radiant and burner assembly 13. To further assure the comfort of the operator, a front panel 43 is mounted forwardly of, and in spaced relationship to, the heat shield 41 which permits free upward flow of cooling air therebetween. Air drafting at the rear of the broiler, as also required to effect a uniform temperature over the entire area of the grid 14, is controlled by an angularly disposed baffle 44 mounted across the rear of the cabinet in spaced relationship to, and above, the radiant and burner assembly 13. The resulting substantially completely open rear of the upper part of the cabinet 11 has the additional advantage of adding greatly to the showmanship of the broiler operation, since it is intended that the instant broiler be mounted on a counter or shelf with its rear side directed toward the potential customers for the food stuffs being broiled.

As best seen in FIG. 1, the sides of the upper portion of the cabinet 11 also are open for substantially their full lengths, which enables venting laterally of the broiler as indicated by the arrows 45, instead of venting out rearwardly, as with the broiler of No. 3,146,693. While this substantially complete opening up of the upper portion of the cabinet 11 resulted in providing a grid temperature that is uniform over the entire area of the grid 14, it was found that this temperature could not be maintained within the desired limited range, which is an important object also dictated by the specific use intended for the broiler.

This object has been attained by the placement of heat retaining, concentrating, or build-up means over the top and as a part of the radiant and burner assembly 13 in the form of a perforated metal screen 46. This screen 46 rests upon the cap plates 36 so as to be interposed between the heat source and the grid, and is provided with front and rear edge flanges embracing the upper ends of the angle members 34. As best seen in FIG. 3, the perforated metal screen 46 intercepts and deflects downwardly a portion of the infra-red rays emanating from the radiants 32, while letting the remaining infra-red rays through to the grid 14. An increased and more constant heat supply is thus provided, and even with the blower 38 operating constantly at full speed, the temperature of the grid 14 will thus be maintained within a very narrow range, regardless of the cooking load. It will be appreciated, of course, that this grid temperature range may be varied by vertical adjustment of the grid through the agency of the latch handle 22. It also will be appreciated that other sources of energy for heating the radiants than gas may be employed, such as electricity, if desired.

Even with these changes and improvements as above described, the use of the broiler was found not to be satisfactory where the operator is required to have his hands or hand in closely adjacent proximity to the grid for extended periods of time. These are the operating conditions encountered in fast serve maximum turnover broiling of hamburger patties, since an operator then is required to deal the patties onto the grid manually in large numbers. The grids of the prior art are not adapted to such use, particularly because they afford no protection against those flames mounting upwardly from the burning drippings which extend through the grid. The desired flame control or preventing flame-up through the grid has been effected with the instant grid by spacing the aluminum bars 17, which are mounted on edge, laterally from each other approximately one-third of their width, with that width being approximately three-eighths of the vertical height of the bars. More specifically, when the bars are one inch high and three-eighths of an inch wide, the required flame control is effected with a spacing between adjacent bars of from one-eighth to three-sixteenths of an inch, or between one-third and one-half of their widths. This arrangement not only prevents flame-through or upward extension of the flames through the grid, but also assists in maintaining a grid temperature which is uniform throughout its entire area.

The above-described novel features result in an open hearth broiler which assures food product uniformity, palatability, desired appearance, and productivity, especially suited to fast service drive-in operations. A narrow range of grid temperatures is assured, preferably 340 degrees plus or minus 10 degrees F., which is uniform over the entire area of the grid and remains constant indefinitely with burners and blower full on, even during intermittent use of the grid. By comparison, the same energy input with the same burners and radiants, only with the grid enclosed as in the prior art noted, resulted in average temperatures across the front of the grid of 409 degrees F. and across the rear of the grid of 520 degrees F. Of course, the grid temperature may be varied by adjusting the position of the grid vertically, as previously noted.

It will be appreciated from the above that constant and even heat distribution over the entire area of the grid is provided, thus requiring no special handling of the food being broiled from one section of the grid to another. The perforated metal screen mounted above and forming a part of the heat source or radiant and burner assembly diffuses a large percentage of the infrared rays to circulate the same back into the heat source to stabilize and control the heat emanating therefrom. In essence, this comprises a superheating function of the firebox and, together with the opening up of the upper portion of the cabinet, which effects a temperature mixing, distributing and tempering function, results in the grid temperature being constantly maintained within the desired narrow range without regard to the quantity of food stuffs being broiled.

This also solves one aspect of the problem of providing the operator with acceptable working conditions from the standpoint of the temperature to which he is subjected. Of course, the heat shield and front panel provided across the forward portion of the cabinet guard against excessive heating of the ambient air at the front of the broiler, and the novel design of the grid solves the second portion of this problem of assuring tolerable working conditions for the operator in preventing flare-up of flames through the grid due to excessive drippings of fat from the food stuffs being broiled. And the novel firebox arrangement with the opening up of the top portion of the cabinet also has effected improved combustion of the fat drippings.

For example, it has been found that, because a considerable portion of the fat drippings now are intercepted in the first instance by, and are burned on the upper surface of, the perforated metal screen 46, the importance of the auxiliary air supply and blower 38 is greatly reduced. In fact, the firebox construction hereinbefore described may be modified, if desired, by eliminating the air ducts 33, the air manifolds 37 and 39, and the blower 38. Such a modified construction is shown in FIG. 3, wherein the arrows 47 illustrate the drafting of some of the primary air through the radiants 32 and into the heat chamber, defined by the latter, the grease troughs 23 and the perforated screen 46, to assure complete combustion of the fat drippings which may not be burned on the screen 46 and fall through it. Thus, in addition to its super-heating function, the screen 46 intercepts some of the fat drippings to effect burning of the same thereon. Proper combustion thereof is assured by secondary air supplied above the screen by virtue of the open construction of the upper portion of the cabinet 11. The air thus supplied because of the upper portion of the cabinet being open also mixes with and tempers the superheated air from the heat chamber.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

We claim:

1. An open hearth broiler, comprising a grid, including a plurality of bars having rectangular cross sections disposed on edge in spaced parallel relationship; burner means disposed below and supplying infra-red rays to said grid, including blower means for supplying air to effect combustion of fat dripping from food products being broiled on said grid, and heat retention means in the form of a covering perforated plate; and a cabinet having a lower portion enclosing said burner means, and an upper portion supporting said grid and substantially fully open on all sides to the surrounding atmosphere and formed to assure an upwardly directed supply of cool air at the front, upward and inward drafting at the rear, and outward venting laterally below said grid.

2. An open hearth broiler, comprising a grid, a heat source disposed below and supplying infra-red rays to said grid to cook food supported thereon, and a cabinet having a lower portion enclosing said heat source and an upper portion supporting said grid in cooking position spaced upwardly from said lower portion, said upper portion of said cabinet being substantially fully open on top and on all sides to the surrounding atmosphere and formed to assure an upwardly directed supply of cool air at the front, upward and inward drafting at the rear, and outward venting laterally below said grid.

3. In an open hearth broiler having a grid, and a heat source disposed below and supplying infra-red rays to said grid; a cabinet having a lower portion enclosing said heat source, and an upper portion supporting said grid and substantially fully open on all sides to the surrounding atmosphere; said grid comprising a plurality of bars having rectangular cross sections disposed on edge in spaced parallel relationship, wherein the width of said bars is substantially three-eighths of an inch and adjacent said bars are spaced from each other a distance between one-eighth and three-sixteenths of an inch when said bars are an inch high.

4. An open hearth broiler, comprising a heat source for supplying upwardly directed infra-red rays, and a grid disposed above said heat source in vertically spaced relationship relative thereto and comprising a plurality of metal bars having rectangular cross sections disposed on edge in spaced parallel relationship relative to each other, wherein the width of said bars is substantially three-eighths of an inch and adjacent said bars are spaced from each other a distance between one-eighth and three-sixteenths of an inch when said bars are an inch high.

References Cited

UNITED STATES PATENTS

| | | | |
|---|---|---|---|
| 898,814 | 9/1908 | Zehring | 126—41 X |
| 1,504,102 | 8/1924 | Davis | 99—447 X |
| 2,722,883 | 11/1955 | Rignell | 99—446 X |
| 2,812,706 | 11/1957 | Del Francia et al. | 99—446 |
| 2,848,990 | 8/1958 | Haedike et al. | 126—41 |
| 2,874,631 | 2/1959 | Cooksley. | |
| 2,926,655 | 3/1960 | Martin | 99—447 |
| 3,090,373 | 5/1963 | Yagley et al. | 126—41 |
| 3,146,693 | 9/1964 | Di Pietro | 99—446 |

WILLIAM I. PRICE, *Primary Examiner.*